United States Patent [19]
Kurihara et al.

[11] Patent Number: 4,789,936
[45] Date of Patent: Dec. 6, 1988

[54] AUTOMATIC TRANSMISSION SYSTEM

[75] Inventors: Kazumasa Kurihara; Kenji Arai, both of Higashimatsuyama, Japan

[73] Assignee: Diesel Kiki Co., Ltd., Tokyo, Japan

[21] Appl. No.: 794,895

[22] Filed: Nov. 4, 1985

[30] Foreign Application Priority Data

Nov. 8, 1984 [JP] Japan .................... 59-234191

[51] Int. Cl.[4] .................. F16H 5/66; B60K 41/08; G05D 17/02
[52] U.S. Cl. .................... 364/424.1; 74/866; 364/442
[58] Field of Search ............... 364/424.1, 442; 74/866

[56] References Cited

U.S. PATENT DOCUMENTS

| 4,380,048 | 4/1983 | Kishi et al. | 364/424.1 |
| 4,463,427 | 7/1984 | Bonnetain et al. | 364/424.1 |
| 4,517,646 | 5/1985 | Magnusson et al. | 364/424.1 |
| 4,523,281 | 6/1985 | Noda et al. | 364/424.1 |
| 4,564,906 | 1/1986 | Stephan et al. | 364/424.1 |
| 4,635,508 | 1/1987 | Tatsumi | 364/424.1 |
| 4,643,048 | 2/1987 | Hattori et al. | 364/424.1 |

FOREIGN PATENT DOCUMENTS 3243461  7/1983  Fed. Rep. of Germany ... 364/424.1

Primary Examiner—Felix D. Gruber
Attorney, Agent, or Firm—James Creighton Wray

[57] ABSTRACT

In an automatic transmission system for a vehicle having a gear-type transmission, a clutch connected to the gear-type transmission and an actuator for operating the gear-type transmission and the clutch, the system has a controller for controlling the operation of the actuator in accordance with the magnitude of load of the vehicle at each instant so as to shift the gear-type transmission into the target gear position. Thus, good fuel economy can be realized together with smooth driving performance even when the vehicle load is changed.

7 Claims, 7 Drawing Sheets

FIG. 2
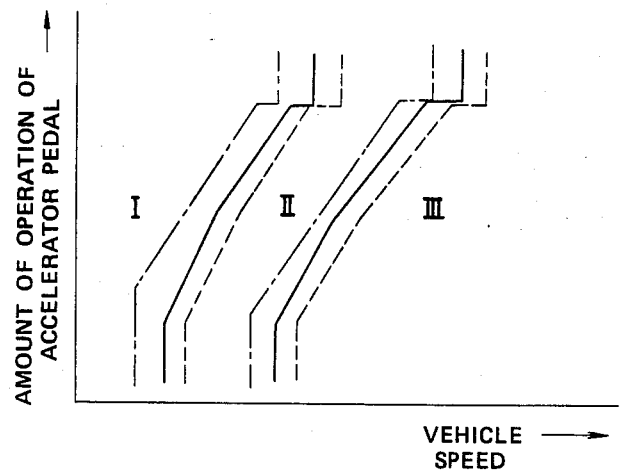
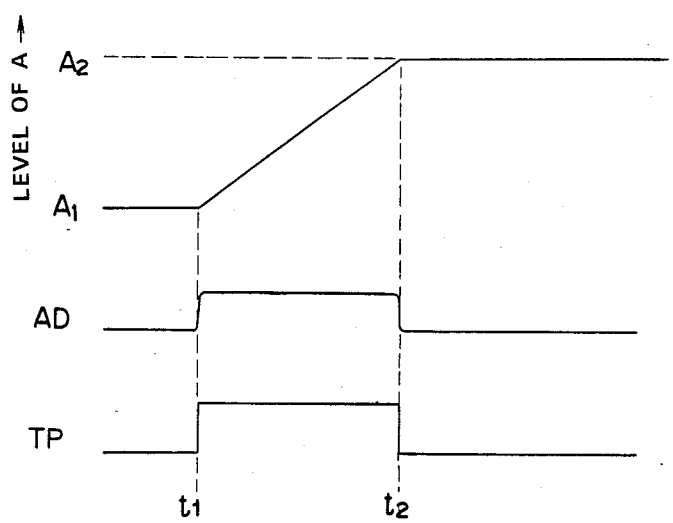
FIG. 4A
FIG. 4B
FIG. 4C

AUTOMATIC TRANSMISSION SYSTEM

BACKGROUND OF THE INVENTION

The present invention relates to an automatic transmission system for vehicles employing a gear-type transmission, in which the gear change operation of the gear-type transmission is automatically carried out in accordance with the operating condition of the vehicle at each instant.

In the prior art, there have been proposed various automatic transmission systems for vehicles comprising a gear-type transmission with an actuator for changing gears in response to electric signals, and a gear change map for determining the appropriate gear position on the basis of the amount of operation of an accelerator pedal and the vehicle speed, whereby the gear-type transmission is automatically shifted in accordance with the result of the determination based on the gear change map.

In the case where the gear position of the gear-type transmission is determined in accordance with only the amount of operation of the accelerator pedal and the vehicle speed, however, even when the driving condition of the vehicle changes, for example, due to a change in the weight of the load, hill-climbing or the like, the gear change operation of the gear-type transmission is still carried out in accordance with a gear change map determined on the basis of the standard driving condition of the vehicle. As a result, when the load condition of the vehicle changes due to a change in driving condition, it is not possible to realize appropriate gear changing operation of the gear-type transmission, making the vehicle difficult and unpleasant to drive.

SUMMARY OF THE INVENTION

It is an object of the present invention to provide an improved automatic transmission system for vehicles using a gear-type transmission.

It is another object of the present invention to provide an automatic transmission system for vehicles, in which the shifting of a gear-type transmission can be automatically carried out by the use of an actuator responsive to an electric signal without impairing vehicle drivability even when the vehicle load changes.

According to the present invention, in an automatic transmission system for a vehicle having a gear-type transmission, a clutch connected to the gear-type transmission and an actuating means responsive to an electric signal for operating the gear-type transmission and the clutch so as to shift the gear-type transmission into the desired gear position, the system comprises means for producing a first signal relating to the speed of the vehicle, means for producing a second signal relating to the amount of operation of an accelerator pedal, means for producing a third signal relating to the load of the vehicle, and a control means responsive to the first through third signals for producing a control signal for actuating the actuating means to shift the gear-type transmission into a target gear position. The control means has a memory for storing at least one set of map data indicating gear positions determined by the amount of operation of the accelerator pedal and the speed of the vehicle, and the target gear position is determined on the basis of the map data, whereby the gear change operation is automatically carried out taking into account the load of the vehicle at each instant.

In one embodiment of the present invention, the control means has a plurality of sets of map data which are provided in correspondence to the various load values and one of the results determined on the basis of these sets of map data is selected in accordance with the third signal showing the load of the vehicle. Thus, the target gear position is determined in response to the first to third signals.

According to the present invention, since the target gear position is determined in accordance with at least the speed of the vehicle, the amount of operation of the accelerator pedal and the load condition of the vehicle, it is possible to control the shifting of the gear-type transmission without impairing vehicle drivability even when the vehicle load is changed. More specifically, when the vehicle load is large, the transmission can be shifted at relatively higher engine speed so as to assure smooth vehicle performance after shifting, and, when the vehicle load is small, it can be shifted at a relatively lower engine speed in order to assure low fuel consumption per unit distance. Thus, good fuel economy can be realized together with smooth driving performance.

The invention will be better understood and other objects and advantages thereof will be more apparent from the following detailed description of preferred embodiments with reference to the accompanying drawings.

BRIEF DESCRIPTION OF THE DRAWINGS

FIG. 2 is a graph showing gear change characteristic curves used for determining the target gear position in the automatic transmission system of FIG. 1;

FIGS. 4A to 4C are time charts for explaining the circuit shown in FIG. 3;

DETAILED DESCRIPTION OF THE INVENTION

Figure 1:
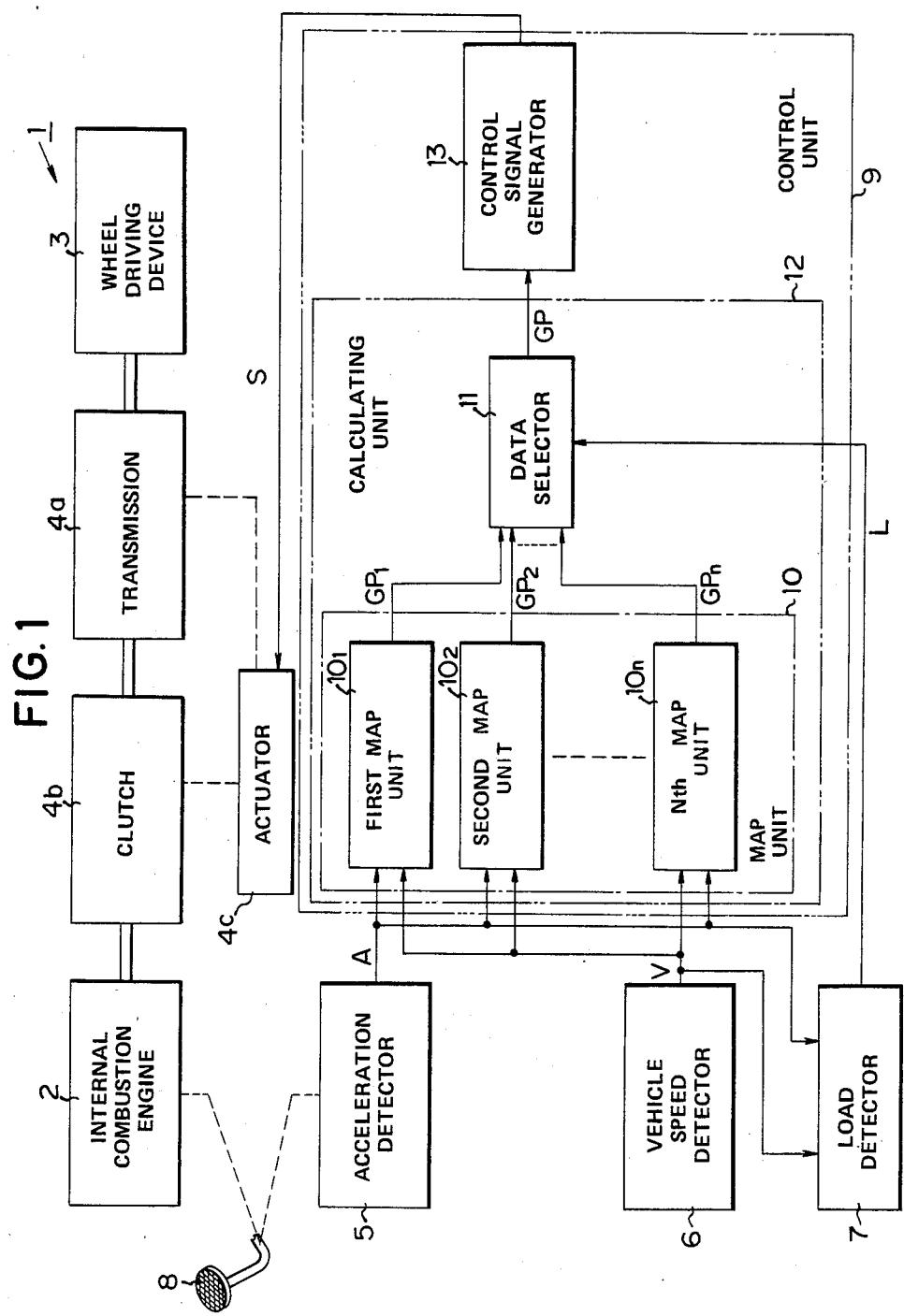
FIG. 1 is a block diagram of an embodiment of the automatic transmission system according to the present invention.

FIG. 1 is a block diagram showing an embodiment of an automatic transmission system for a vehicle according to the present invention. The automatic transmission system 1 has a gear-type transmission $4_a$ and a clutch $4_b$ which are located between an internal combustion engine 2 for driving a vehicle (not shown) and a wheel driving device 3, an actuator $4_c$ associated with the transmission $4_a$ and the clutch $4_b$ for operating them in order to shift the transmission $4_a$ into the desired gear position, and a control unit 9 for controlling the actuator $4_c$ in order to automatically perform the operation of shifting the transmission $4_a$.

The transmission $4_a$ is a conventional three-speed gear box and, though not shown in FIG. 1, the actuator $4_c$ is comprised of two separate actuators, one for operating the transmission $4_a$ and the other for operating the clutch $4_b$. The transmission $4_a$ and the clutch $4_b$ are operated by the actuator $4_c$ so as to shift the transmission $4_a$ in accordance with a control signal S from the control unit 9. Since such a device for changing the gear of the gear-type transmission in response to an electric signal is known, no detailed description of the construction thereof will be given here.

In order to obtain a condition signal for deciding the target gear position of the transmission $4_a$, the automatic transmission system 1 is provided with an acceleration detector 5 and a vehicle speed detector 6. The acceleration detector 5 is associated with an accelerator pedal 8 and produces an acceleration signal A indicating the amount of operation of the accelerator pedal 8, while the vehicle speed detector 6 produces a vehicle speed signal V indicating the speed of the vehicle (not shown) powered by the internal combustion engine 2. The acceleration signal A and the vehicle speed signal V are applied to a load detector 7 which, on the basis of the change in the amount of the operation of the accelerator pedal 8 and the rate of acceleration of the vehicle determines the magnitude of the vehicle load and produces a load signal L indicative of the magnitude of the vehicle load at each instant. That is, in this embodiment, the vehicle load is determined from the change in the vehicle speed and the change in the amount of depression of the accelerator pedal 8. The acceleration signal A, the vehicle speed signal V and the load signal L are applied to the control unit 9.

The control unit 9, which comprises a determining unit 12 having a map unit 10 and a data selector 11, determines the target gear position in response to the acceleration signal A, the vehicle speed signal V and the load signal L. The map unit 10 has first to Nth map units $10_1$ to $10_n$, each of which is responsive to the acceleration signal A and the vehicle speed signal V.

These, map units $10_1$ to $10_n$ have memory sections (not shown) in which respective sets of map data corresponding to gear change characteristics for different loads are stored and the determination in each of these map units is carried out in accordance with the stored map data shown in FIG. 2, in order to determine the target gear position from the values of the acceleration signal A and the vehicle speed signal V at each instant. In FIG. 2, I denotes a region suitable for low gear position, II a region suitable for second gear position, and III a region suitable for high gear position. In the memory sections of these map units $10_1$ to $10_n$ are stored n sets of map data representing n suitable characteristics for n kinds of load conditions of the vehicle. Therefore, for any one combination of the acceleration signal A and the vehicle speed signal V, n gear position data $GP_1$ to $GP_n$ are obtained from the map units $10_1$ to $10_n$ in the map determining unit 10, and these gear position data $GP_1$ to $GP_n$ are applied to the data selector 11.

The map data stored in each of the memory sections is for deciding the target gear position of the transmission $4_a$ for a specific vehicle load condition in accordance with the acceleration signal A and the vehicle speed signal V. In FIG. 2, standard gear change characteristics are shown by solid lines, which is suitable for a predetermined engine load condition of the vehicle. The gear change characteristics for higher load condition than the standard gear change characteristic are shifted to the right in FIG. 2 in accordance with the increase in the load, as shown by the broken lines. Consequently, if the amount of operation of the accelerator pedal 8 is not changed, the gear is shifted up at a higher vehicle speed than when the control is carried out according to the standard gear change characteristics, so that larger driving torque can be assured even after changing gears. On the other hand, the gear change characteristics for lower load condition than the standard gear change characteristic are shifted to the left in FIG. 2 in accordance with the decrease of the load, as shown by the dot-dash lines. Consequently, if the amount of operation of the accelerator pedal 8 is not changed, the gear is shifted down at a lower vehicle speed than when the control is carried out according to the standard gear change characteristics, so that less fuel is consumed per unit distance. Thus, in the case of the gear change characteristics for lower vehicle load the emphasis is on reducing fuel consumption per unit distance rather than on attaining sufficient driving torque.

In response to the load signal L, the data selector 11 selects the gear position data from the map unit having the map data most appropriate for the vehicle load at that time, and the selected gear position data is applied as the target gear position data GP to a control signal generator 13. The control signal generator 13 produces the control signal S for operating the actuator $4_c$ so as to shift the transmission $4_a$ into the gear position indicated by the gear position data GP.

Figure 3:
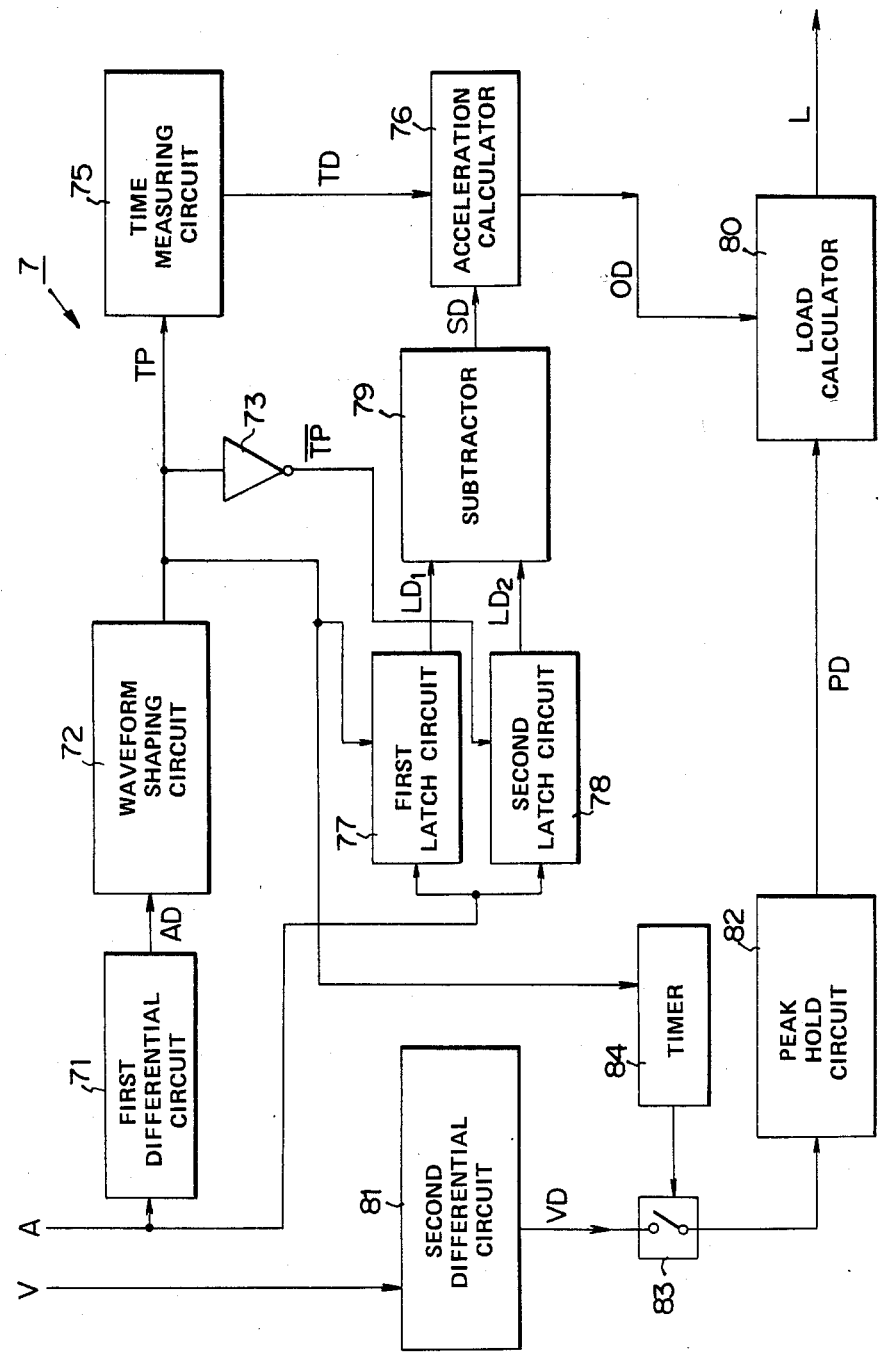
FIG. 3 is a detailed block diagram of the load detector shown in FIG. 1.

FIG. 3 shows a detailed block diagram of the load detector 7 in FIG. 1. The load detector 7 has a first differential circuit 71 for differentiating the acceleration signal A to determine the time when the depression of the accelerator pedal for the acceleration of the vehicle starts (the first time) and the time when the depression of the accelerator pedal for the acceleration of the vehicle ends (the second time). When the accelerator pedal 8 is operated for the acceleration of the vehicle in the manner shown in FIG. 4A, a first differential signal AD is produced from the first differential circuit 71 shown in FIG. 4B.

The first differential signal AD is applied to a waveform shaping circuit 72 for shaping the waveform of the first differential signal AD and a signal derived from a waveform shaping circuit 72 is applied to a time measuring circuit 75 as an output pulse TP. The time measuring circuit 75 is provided for measuring the length of the high level period of the output pulse TP, and the time data TD indicating the result of the measurement by the time measuring circuit 75 is applied to an acceleration calculator 76.

In order to detect and latch the magnitudes of the operation of the accelerator pedal 8 at the times $t_1$ and $t_2$, there are provided first and second latch circuits 77 and 78 to which the acceleration signal A is applied. The output pulse TP is applied to the first latch circuit 77 and the inverted output pulse $\overline{TP}$ obtained from an invertor 73 is applied to the second latch circuit 78. The first latch circuit 77 is responsive to the leading edge of the output pulse TP to latch the data indicating the magnitude $A_1$ of operation of the accelerator pedal 8 at $t_1$ and the second latch circuit 78 is responsive to the trailing edge of the output pulse TP to latch the data indicating the magnitude $A_2$ of the operation of the accelerator pedal 8 at $t_2$ (See FIG. 4A). First latch data $LD_1$ indicating the magnitude $A_1$ and second latch data $LD_2$ indicating the magnitude $A_2$ are produced from the first and second latch circuits 77 and 78, and are applied to a subtractor 79 in which the value $A_2-A_1$ is calculated on the basis of the first and second latch data $LD_1$ and $LD_2$. Thus, the amount of change in the magnitude of operation of the accelerator pedal 8 between time $t_1$ and time $t_2$ is calculated in the subtractor 79 and difference data SD representing $A_2-A_1$ is supplied from the subtractor 79 to the acceleration calculator 76.

The acceleration calculator 76 calculates $(A_2-A_1)/(t_2-t_1)$ in response to the time data TD and the difference data SD and outputs the result of this calculation as operation speed data OD showing the speed of operation of the accelerator pedal 8. The operation speed data OD is applied to a load calculator 80.

The load detector 7 has a second differential circuit 81 for differentiating the vehicle speed signal V to obtain vehicle acceleration data VD indicating the acceleration of the vehicle at each instant, whereby it is possible to determine the acceleration of the vehicle when the accelerator pedal 8 is depressed. The vehicle acceleration data VD is applied to a peak hold circuit 82 through a switch 83 which is operated by a timer 84 so as to be closed only for a period of predetermined length after the time the depression of the accelerator pedal 8 starts. The predetermined time period should be set in such a way that the maximum value of the acceleration of the vehicle in response to the depression of the accelerator pedal 8 is surely sent to the peak hold circuit 82, and should not be unnecessarily long. When the time period is so set, the peak hold circuit 82 receives acceleration data VD only for the required period in view of the depressing operation of the accelerator pedal 8 and is able to hold the maximum value of the acceleration of the vehicle obtained during the depressing operation of the accelerator pedal 8. The data PD held by the peak hold circuit 82 is applied to the load calculator 80 to calculate the vehicle load at that time on the basis of the data PD and the operation speed data OD. The load calculator 80 may be constructed by the use of map data representing the relationship among the operation speed of the accelerator pedal 8, the corresponding acceleration of the vehicle and the vehicle load. Data indicating the result of the calculation by the load calculator 80 is derived as the load data L.

Figure 5:
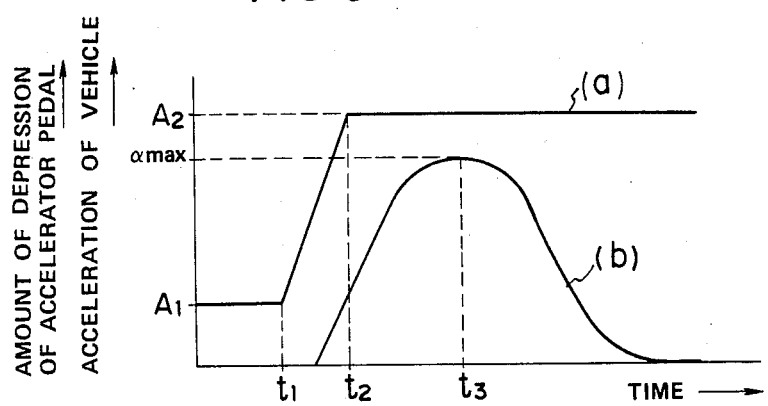
FIG. 5 is a graph showing the relationship between the amount of depression of an accelerator pedal and the vehicle acceleration.

The operation of the load detector 7 will be described in conjunction with FIG. 5. When the operator depresses the accelerator pedal 8 from $A_1$ to $A_2$ as shown by the curve (a) in order to accelerate the vehicle, the acceleration of the vehicle changes as shown by the curve (b). When depression of the accelerator pedal 8 starts at $t_1$ and terminates at $t_2$, the maximum value $\alpha_{max}$ of the acceleration of the vehicle is reached at $t_3$ after further depression of the accelerator pedal 8 is stopped. As described above, the predetermined time set in the timer 84 is selected so as to open the switch 83 after $t_3$, so that the maximum value $\alpha_{max}$ can be held by the peak hold circuit 82. Thus, the vehicle load can be detected by the load detector 7 on the basis of the amount of depression of the accelerator pedal 8 and the value $\alpha_{max}$ at this time.

The operation of the automatic transmission system 1 will be now described.

When the vehicle is driven with relatively small load, the gear change operation is carried out in the low-fuel consumption mode according to, for example, the characteristics shown by the dot-dash lines in FIG. 2 in accordance with the output from the determining unit 12. On the other hand, when the vehicle is driven with relatively large load, the gear change operation is carried out in the high torque mode according to, for example, the characteristics shown by the broken lines in FIG. 2 in accordance with the output of the determining unit 12.

As described above, since the gear-change characteristics are changed taking account of the vehicle load, it is possible to shift the transmission in accordance with the vehicle load at each instant, so that smooth driving operation at an appropriate rate of fuel consumption can be obtained.

Figure 6:
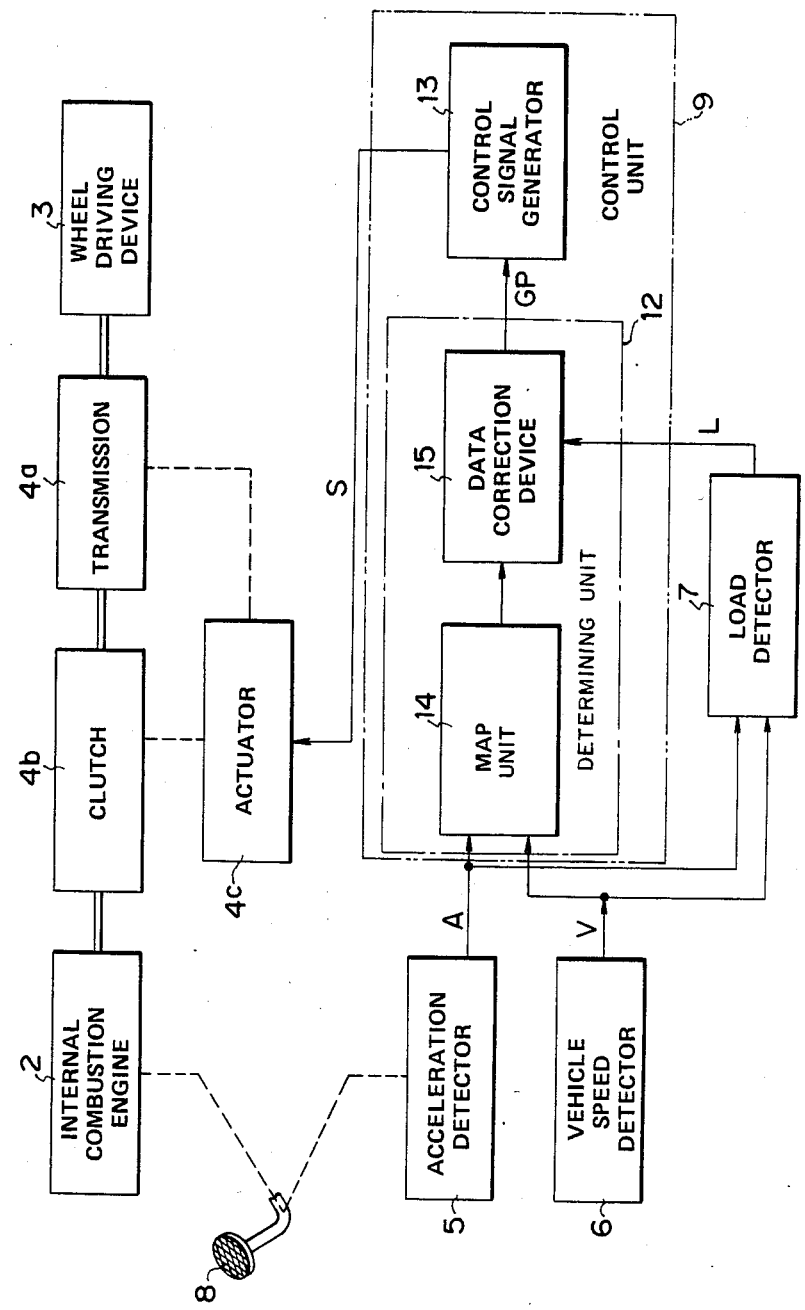
FIG. 6 is another embodiment of the automatic transmission system according to the present invention.

In the embodiment described above, there are provided a plurality of map units in order to change the gear change control characteristics of the transmission $4_a$. However, for changing said characteristics, it is possible as shown in FIG. 6 to instead provide a data correcting device 15 on the output side of a map unit 14 for carrying out a determination of the gear change position in accordance with the gear change characteristics shown by the solid lines in FIG. 2 so as to correct the output data from the map unit 14 in accordance with the load data L at each instant. In FIG. 6, the same portions as those in FIG. 2 are designated by like references and the descriptions thereof are omitted.

Figure 7:
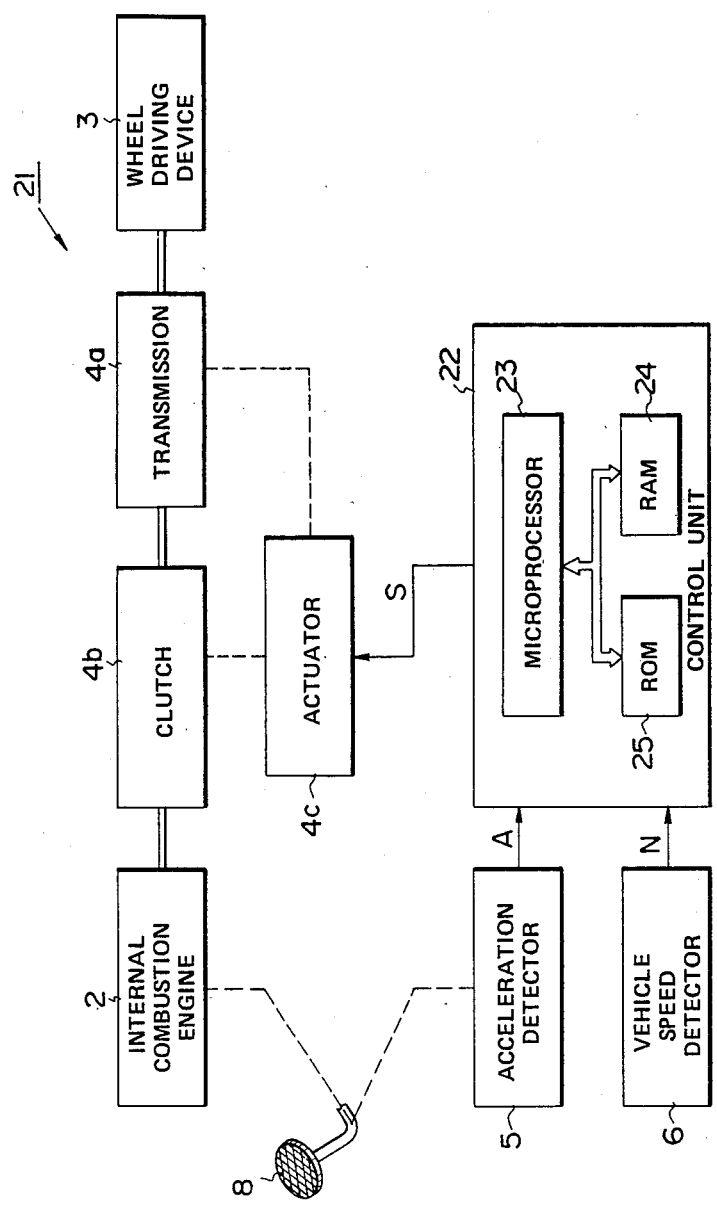
FIG. 7 is a further embodiment of the automatic transmission according to the present invention.

FIG. 7 shows a block diagram of another embodiment of an automatic vehicle transmission system according to the present invention. The automatic vehicle transmission system 21 has a control unit 22 which corresponds to the control unit 9 of FIG. 1 and includes a microprocessor 23, a random access memory (RAM) 24 and a read only memory (ROM) 25 in which a control program is stored. The control program is executed in the microprocessor 23 and the control unit 22 is able to perform the same control function as that of the control unit 9. The control unit 22 receives the acceleration signal A from the acceleration detector 5 and the vehicle speed signal V from the vehicle speed detector 6 and produces a control signal S.

Figure 8:
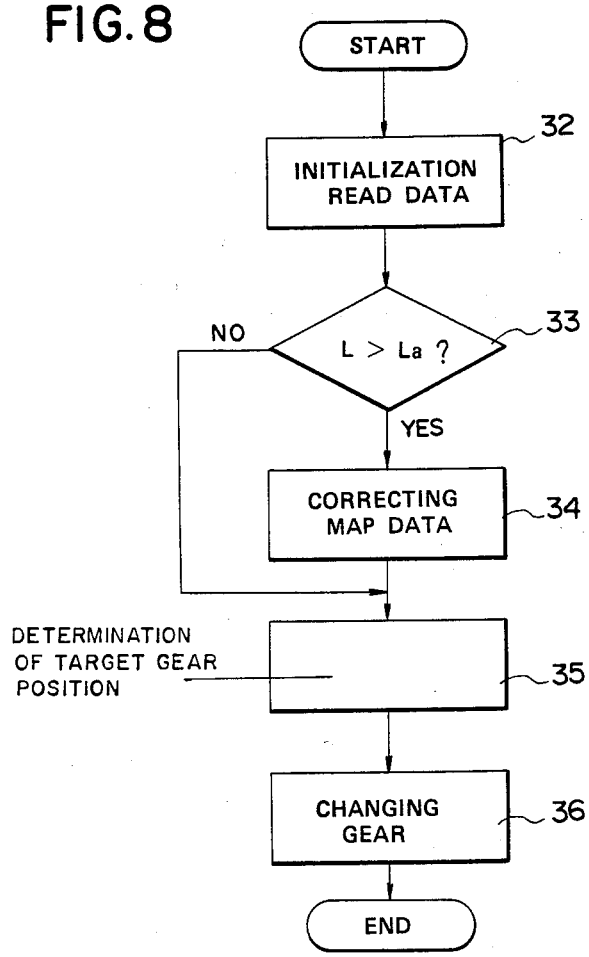
FIG. 8 is a flow chart representing a program executed by the microprocessor of the system shown in FIG. 7.

FIG. 8 shows a flow chart of the control program stored in the ROM 25. After the start of the control program, the operation moves to step 32 wherein an initialization is executed and data indicating the acceleration signal A and the vehicle speed signal V is read in. After this, the operation moves to step 33 in which a decision is made as to whether the vehicle load L is more than a predetermined value $L_a$. The value of L may be calculated in accordance with another program shown in FIG. 9, which will be described in more detail hereinafter.

When the decision in step 33 is YES, the operation moves to step 34 in which the calculated value of L is stored in the RAM 24 and the map correcting operation is carried out. That is, in the ROM 25, gear change characteristic data corresponding to the characteristics shown by the solid lines in FIG. 2 is stored as map data for deciding the target gear position in accordance with the acceleration signal A and the vehicle speed signal V, and the gear change characteristic data is corrected to the characteristics shown by the broken lines in FIG. 2, for example. After this, the operation moves to step 35 in which the determination of the target gear position in accordance with the characteristic data corrected in step 34 is carried out.

When the decision in step 33 is NO, the operation moves to step 35 without executing step 33, so that the determination of the target gear position in this case is carried out in accordance with the uncorrected gear change characteristics, that is, the characteristics shown by the solid lines in FIG. 2.

In step 36, the present gear position of the transmission $4_a$ is compared with that determined in step 35, and the gear change operation is carried out so as to change the gear to the position determined in step 35 when the two gear positions are different from each other, whereby the transmission is automatically shifted. When the present gear position is the same as the determined target position, the gear change operation is not carried out.

The operation for calculating the load L will be described in conjunction with FIG. 9. In this embodiment, the program for calculating the load L is carried out at all times other than when the vehicle speed is zero.

Figure 9:
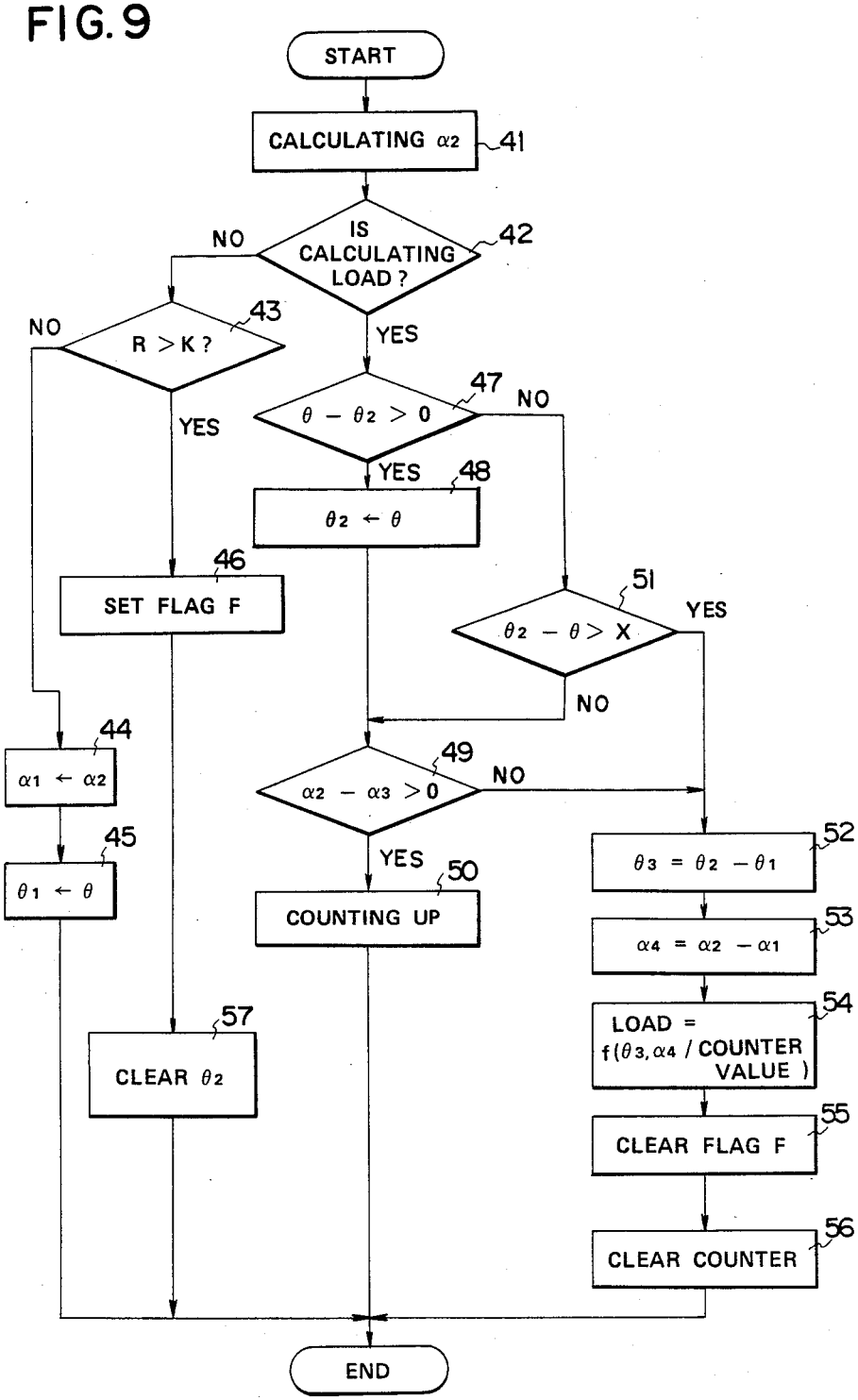
FIG. 9 is a detailed flow chart of the calculation of the vehicle load.

In FIG. 9, the acceleration $\alpha_2$ of the vehicle is calculated on the basis of the vehicle speed signal V in step 41 and the operation moves to step 42 wherein a decision is made on the basis of the condition of a flag F described hereinafter as to whether the calculation for obtaining the vehicle load is being carried out. When the decision in step 42 is NO, a decision is made in step 43 as to whether the rate R of change in the amount $\theta$ of depression of the accelerator pedal 8 is more than a predetermined value K. When the decision in step 43 is NO, the operation moves to step 44 wherein the value of $\alpha_2$ is set as the value of $\alpha_1$. In this case, the operation further moves to step 45 wherein the amount $\theta$ is set as the value of $\theta_1$ and the operation is terminated, whereby the procedure returns to the program shown in FIG. 8. On the other hand, when the decision in step 43 is YES, the flag F indicating whether or not the calculation for obtaining the vehicle load is being carried out is set in step 46 and the procedure is returned to the program shown in FIG. 8 after the value of $\theta_2$ is cleared in step 57.

Consequently, when the program shown in FIG. 9 is executed the next time, it follows that the decision in step 42 becomes YES and the operation moves to step 47, wherein a decision is made as to whether the amount $\theta$ of depression of the accelerator pedal 8 at this time is more than the maximum amount $\theta_2$ of depression of the accelerator pedal 8 up to that time. When the decision in step 47 is YES, the operation moves to step 48 wherein the up-dated amount $\theta$ of depression of the accelerator pedal 8 is set as the value of $\theta_2$. After this, the operation moves to step 49 wherein a decision is made as to whether the magnitude of $\alpha_2$ obtained at this time is more than that of $\alpha_3$ obtained one program cycle before. When the decision in step 49 is YES, the operation moves to step 50 wherein the content of the counter is incremented by 1 and the operation is returned to the program shown in FIG. 8.

When the decision in step 47 is NO, that is, when the rate of increase in the amount of depression of the accelerator pedal 8 declines or the direction of operation of the accelerator pedal 8 is reversed, the operation moves to step 51 wherein a decision is made as to whether $\theta_2 - \theta$ is more than a predetermined value X. In other words, a decision is made as to whether the amount of the returning operation of the accelerator pedal 8 is more than a predetermined value, and the operation moves to step 49 when the decision in step 51 is NO.

When the decision in step 51 is YES or the decision in step 49 is NO, the operation moves to step 52 wherein the calculation of $\theta_2 - \theta_1$ is carried out and the calculated result is stored as $\theta_3$. After this, the operation further moves to step 53 wherein the calculation $\alpha_2 - \alpha_1$ is carried out and the calculated result is stored as $\alpha_4$. Thus, the vehicle load is calculated on the basis of $\theta_3$, $\alpha_4$ and the count value of the counter in step 54.

When the calculation of the vehicle load is terminated, the flag F is reset in step 55 and the counter is reset in step 56. That is, the flag F is set when it is detected that the change in the amount of depression of the accelerator pedal 8 becomes more than the predetermined value, and the calculation for obtaining the vehicle load is carried out. The calculation of the vehicle load is terminated when it is detected in step 51 that the accelerator pedal 8 is returned or it is detected in step 49 that the inflection point of the acceleration of the vehicle has been passed.

In addition, in the embodiment described above, the calculation for obtaining the vehicle load is carried out on the basis of the change in the amount of the operation of the accelerator pedal 8 and the vehicle acceleration. However, when the vehicle load is calculated by taking account of the operating speed of the accelerator pedal 8, the calculation will be performed with higher precision.

Furthermore, in the aforesaid embodiments, the load detector is constructed in such a way that the vehicle load is determined on the basis of the change in the amount of operation of the accelerator pedal and the change in the vehicle speed. However, the present invention is not limited to the arrangement described above and the determination of the vehicle speed may also be detected by the use of any other suitable arrangement.

According to the present invention, changing of the gear change characteristics is automatically carried out in response to a change in the weight of the load, the grade of the road and the like, since the gear position is selected taking account of the vehicle load in addition to the amount of the operation of the accelerator pedal and the vehicle speed. Therefore, it is possible to realize good driving performance regardless of the vehicle load and to reduce fuel consumption per unit distance.

We claim:

1. An automatic transmission system for a vehicle having a gear-type transmission, a clutch connected to the gear-type transmission and an actuating means responsive to an electric signal for operating the gear-type transmission and the clutch so as to shift the gear-type transmission into a target gear position, said system comprising;

means for producing a first signal relating to the vehicle speed;

means for producing a second signal relating to the amount of operation of an accelerator pedal;

a first means responsive to said second signal for producing a rate signal indicating the rate of the operation of the accelerator pedal per unit time for each depression of the accelerator pedal;

a second means responsive to said first signal for producing a maximum acceleration signal indicating the maximum acceleration of the vehicle due to the depression of the accelerator pedal;

a third means responsive to the signals from said first and second means for calculating the vehicle load and producing a third signal indicating the calculating vehicle load; and a control means responsive to said first through third signals for producing a control signal for operating said actuating means so as to shift the gear-type transmission into the target gear position determined for the operating condition of the vehicle at that time.

2. An automatic transmission system as claimed in claim 1 wherein said control means has a determining means responsive to said first through third signals for determining the target position and a producing means responsive to the result of the determination by said determining means for producing said control signal.

3. An automatic transmission system as claimed in claim 2 wherein said determining means has a plurality of map determining means which are responsive to said first and second signals and determining target gear positions on the basis of gear change map data corresponding to different gear change characteristics for different vehicle loads, and a data selecting means for selecting the output from one of the plurality of map determining means in accordance with said third signal as the output of said determining means.

4. An automatic transmission system as claimed in claim 2 wherein said determining means has a map determining means for determining an optimum gear position in response to said first and second signals and a correcting means responsive to the result of said map determining means for correcting the target gear position obtained by said map determining means in response to said third signal.

5. An automatic transmission system as claimed in claim 1 wherein said first means has means responsive to said second signal for producing a start signal indicating the time at which the depression of the accelerator pedal is started and a termination signal indicating the time at which the depression of the accelerator pedal is terminated, means responsive to the start and termination signals for calculating the operation time period between the start and termination of the depression of the accelerator, means responsive to the start signal, the termination signal and said second signal for producing an amount signal indicating the amount of the operation of the accelerator pedal during the operation time, and means for calculating the rate signal on the basis of the operation time and the amount signal.

6. An automatic transmission system as claimed in claim 5 wherein said second means has means for differentiating said first signal to obtain a vehicle acceleration signal indicating the acceleration of the vehicle at each instant, a gate means responsive to the start signal for switching the vehicle acceleration signal so as to be passed only during a predetermined period beginning from the production of the start signal, and means responsive to a signal passing through said gate means for holding a maximum value of the vehicle acceleration signal to produce the maximum acceleration signal.

7. An automatic transmission system as claimed in claim 6 wherein said rate means has a switching element for switching the vehicle acceleration signal and a control means responsive to the start signal for controlling said switching element so as to obtain the portion of the vehicle acceleration signal effected by the operation of the accelerator pedal causing the start signal.

* * * * *